US012535509B2

(12) United States Patent
Zhang et al.

(10) Patent No.: US 12,535,509 B2
(45) Date of Patent: Jan. 27, 2026

(54) WIDEBAND MEASUREMENT SYSTEM FOR MIXED-CONNECTED CAPACITIVE VOLTAGE TRANSFORMER BASED ON OPTICAL VOLTAGE SENSOR

(71) Applicant: HARBIN INSTITUTE OF TECHNOLOGY, Harbin (CN)

(72) Inventors: Guoqing Zhang, Harbin (CN); Wenbin Yu, Harbin (CN); Caiyun Mo, Harbin (CN); Yuxin Zhang, Harbin (CN); Jie Zuo, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 173 days.

(21) Appl. No.: 18/544,543

(22) Filed: Dec. 19, 2023

(65) Prior Publication Data

US 2024/0125821 A1    Apr. 18, 2024

Related U.S. Application Data

(63) Continuation of application No. PCT/CN2023/116305, filed on Aug. 31, 2023.

(30) Foreign Application Priority Data

Sep. 2, 2022   (CN) .......................... 202211072845.2

(51) Int. Cl.
  *G01R 15/22* (2006.01)
  *G01R 19/10* (2006.01)
(52) U.S. Cl.
  CPC ............. *G01R 15/22* (2013.01); *G01R 19/10* (2013.01)
(58) Field of Classification Search
  CPC ........ G01R 15/16; G01R 15/06; G01R 15/18; G01R 15/22; G01R 1/30; G01R 19/0084;
  (Continued)

(56) References Cited

U.S. PATENT DOCUMENTS 5,247,244 A * 9/1993 Miller ................... G02F 1/0305
  324/105
7,567,881 B2 * 7/2009 Kasztenny ............. H03H 17/04
  702/107

(Continued)

FOREIGN PATENT DOCUMENTS

CN    103424594 A    12/2013
CN    114243629 A    3/2022

(Continued)

OTHER PUBLICATIONS

Yin Dong, et al., Study on Optical Monitoring Method of Transient Overvoltage Based on Capacitive Voltage Transformer, Shandong Electric Power, 2023, pp. 58-64, vol. 50, No. 303.

(Continued)

*Primary Examiner* — Vinh P Nguyen
(74) *Attorney, Agent, or Firm* — Addison D. Ault; IPGentleman Intellectual Property Services, LLC

(57) ABSTRACT

A schematic diagram of a wideband measurement system for mixed-connected CVT based on an optical voltage sensor is provided. The wideband measurement system comprises a CVT power frequency measurement section and an optical wideband measurement section. In the optical wideband measurement section, a low-voltage capacitor is connected in series between the low-voltage terminal and the ground terminal of the medium-voltage capacitor in the capacitor voltage divider. An optical voltage sensor is connected in parallel across the terminals of the low-voltage capacitor to measure the wideband voltage signal under test. The wideband measurement system for mixed-connected CVT described in the invention enables the CVT to have wideband measurement capabilities while ensuring the accuracy of conventional CVT power frequency measurements.

8 Claims, 3 Drawing Sheets

(58) Field of Classification Search
CPC .... G01R 19/00; G01R 31/003; G01R 31/085;
G01R 31/088; G02F 1/1677; G02F
1/133624; G02F 1/01; G02B 6/0073;
G02B 6/0068; G02B 5/208
See application file for complete search history.

(56) References Cited

U.S. PATENT DOCUMENTS

| | | | |
|---|---|---|---|
| 9,121,872 B2 * | 9/2015 | Wang | G01R 19/155 |
| 9,739,807 B2 * | 8/2017 | Barba Jimenez | G01R 15/18 |
| 2003/0164714 A1 | 9/2003 | Ghassemi | |
| 2008/0243413 A1 | 10/2008 | Kasztenny et al. | |
| 2013/0076338 A1 | 3/2013 | Wang et al. | |

FOREIGN PATENT DOCUMENTS

| | | | |
|---|---|---|---|
| CN | 216350893 U | 4/2022 | |
| CN | 115389805 A | 11/2022 | |
| KR | 100575244 B1 | 5/2006 | |

OTHER PUBLICATIONS

GB/T 14549-93, Quality of electric energy supply Harmonics in public supply network, China National Standards, 1993, The State Bureau of Quality and Technical Supervision.

\* cited by examiner

WIDEBAND MEASUREMENT SYSTEM FOR MIXED-CONNECTED CAPACITIVE VOLTAGE TRANSFORMER BASED ON OPTICAL VOLTAGE SENSOR

CROSS REFERENCE TO THE RELATED APPLICATIONS

This application is a continuation application of International Application No. PCT/CN2023/116305, filed on Aug. 31, 2023, which is based upon and claims priority to Chinese Patent Application No. 202211072845.2, filed on Sep. 2, 2022, the entire contents of which are incorporated herein by reference.

TECHNICAL FIELD

The present invention belongs to the technical field of voltage measurement in power systems.

BACKGROUND

Currently, the Capacitor Voltage Transformers (CVT) is widely used in power grids with voltage levels of 220 kV and above in domestic. The structure and parameters of conventional CVT is designed based on the resonance condition at the power frequency. The inductive reactance of compensation reactor in the CVT is matched with the capacitive reactance of the voltage divider at the power frequency, ensuring accurate measurement. However, when the CVT is used to measure non-power frequency signals such as harmonics and transient signals in the power grid, the impedance matching inside the CVT is disrupted, resulting in severe nonlinearity in the frequency response characteristics at different ratios. This leads to significant output errors that cannot meet the accuracy requirements of the power quality monitoring system for data sources. The Chinese standard GB/T 14549-1993 states that "capacitive voltage transformers cannot be used for harmonic measurement," and similar restrictions are mentioned in IEC standards and relevant technical reports, stating that CVT is not suitable for measuring non-power frequency voltage signals such as harmonics and transient signals.

The transient overvoltage in power grids poses a threat to the safe operation of power equipment, and monitoring the transient over-voltage is crucial for ensuring the safe and reliable operation of the grid. However, there is currently no effective means of monitoring the transient overvoltage, and there is a lack of recorded data on it during accidents. Analysis of accidents caused by transient overvoltage mainly relies on experience, resulting in unclear identification of the accident causes. Utilizing a real-time transient overvoltage monitoring system to record the entire process of fault occurrence allows for accurate determination of the accident causes through analysis of recorded voltage data. This is of significant importance for improving equipment insulation levels and implementing necessary preventive measures. However, in current engineering implementations, due to the absence of well-established practical online monitoring methods for overvoltage and the lack of mandatory requirements for installing transient overvoltage monitoring systems, the availability of field-measured data on the transient overvoltage is extremely limited.

The frequency characteristics of new power systems with renewable energy as their main source pose significant challenges. Firstly, in high-penetration renewable energy grids, such as those with large-scale wind and solar power capacities, the uncertain power generation from these sources can disrupt power balance in the grid, placing higher demands on grid frequency control techniques. Secondly, the widespread use of power electronic devices has introduced a greater variety of frequency components into the grid. The frequency characteristics of high-penetration renewable energy grids encompass not only low-frequency characteristics and high-frequency characteristics but also fundamental frequency fluctuations caused by uncertain power generation. The wideband characteristics of the new power system necessitate wideband measurement requirements for voltage transformers.

SUMMARY

Due to the high requirements for grid frequency control technology and the presence of fundamental frequency fluctuations caused by uncertain power generation in the frequency characteristics of renewable energy grids, as well as the monitoring requirements for transient overvoltage in the grid, wideband measurements are needed. In light of this, the present invention proposes a wideband measurement system for mixed-connected CVT based on an optical voltage sensor.

A wideband measurement system for mixed-connected CVT based on an optical voltage sensor is proposed in this paper, including a CVT power frequency measurement part and an optical wideband measurement part. The optical wideband measurement part comprises a low-voltage capacitor, an optical voltage sensor, a signal processing unit, and a monitoring and analysis host.

In the CVT power frequency measurement part, a low-voltage capacitor is connected in series between the low-voltage terminal and the ground terminal of the capacitor voltage divider. The electrodes of the optical voltage sensor are connected in parallel across the two terminals of the low-voltage capacitor. Under the triggering of the superluminescent diode (SLD) light source in the signal processing unit, the optical voltage sensor divides the light signal modulated by the low-voltage capacitor into two beams and directs them to the signal processing unit. The signal processing unit converts the two incident light signals into two voltage signals $u_{o1}$ and $u_{o2}$, obtaining the mid-to-low voltage signal $u_{oL}(f_1)$ and the high-frequency voltage signal $u_{oH}(f_2)$, respectively. The monitoring and analysis host collects the mid-to-low voltage signal $u_{oL}(f_1)$ and the high-frequency voltage signal $u_{oH}(f_2)$, and calculates to obtain the wideband voltage signal on the primary side.

Furthermore, the aforementioned signal processing unit consists of a low-pass filtering circuit, a 1 #bandpass filter amplifier circuit, a 2 #bandpass filter amplifier circuit, a 1 #divider, a 2 #divider, a 3 #divider, a 4 #divider, a 1 #subtractor, a 2 #subtractor, an SLD light source, a 1 #photodetector, and a 2 #photodetector.

The SLD light source serves as the triggering light source for the optical voltage sensor.

The two beams of light emitted by the optical voltage sensor are respectively converted into voltage signals $u_{o1}$ and $u_{o2}$ through the 1 #photodetector and the 2 #photodetector.

The low-pass filtering circuit extracts the direct-current (DC) bias voltages $U_{s1}$ and $U_{s2}$ from the two voltage signals $u_{o1}$ and $u_{o2}$, respectively.

The 1 #bandpass filter amplifier circuit applies bandpass filtering and amplification processes to the voltage signals $u_{o1}$ and $u_{o2}$, respectively, resulting in the extraction of the mid-to-low frequency voltage signals $u_{1L}(f_1)$ and $u_{2L}(f_1)$.

Similarly, the 2 #bandpass filter amplifier circuit performs bandpass filtering and amplification on the voltage signals $u_{o1}$ and $u_{o2}$, obtaining high-frequency voltage signals $u_{1H}(f_2)$ and $u_{2H}(f_2)$.

The 1 #divider calculates the quotient A between the mid-to-low frequency voltage signal $u_{1L}(f_1)$ and the DC bias voltage $U_{s1}$. The 2 #divider calculates the quotient B between the mid-to-low frequency voltage signal $u_{2L}(f_1)$ and the DC bias voltage $U_{s2}$. The 3 #divider calculates the quotient C between the high-frequency voltage signal $u_{1H}(f_2)$ and the DC bias voltage $U_{s1}$. The 4 #divider calculates the quotient D between the high-frequency voltage signal $u_{2H}(f_2)$ and the DC bias voltage $U_{s2}$.

The 1 #subtractor computes the difference between the quotient A and the quotient B to obtain the mid-to-low frequency voltage signal $u_{oL}(f_1)$. Similarly, the 2 #subtractor computes the difference between the quotient C and the quotient D to obtain the high-frequency voltage signal $u_{oH}(f_2)$.

Furthermore, the aforementioned monitoring and analysis host calculates the wideband voltage signal on the primary side based on the following equation.

$$u_{oL}(f_1)=G_1 k K_C u_1(f_1),$$

$$u_{oH}(f_2)=G_2 k K_C u_1(f_2),$$

Where $G_1$ and $G_2$ represent the amplification factors of the 1 #and 2 #bandpass filter amplifier circuits, respectively. $u_1(f_1)$ and $u_2(f_2)$ denote the mid-to-low frequency voltage component and the high-frequency voltage component, respectively. $u_1$ represents the wideband voltage signal on the primary side loaded at the voltage monitoring terminal, which is the high-voltage end of the voltage divider. k is the electro-optic constant, and $K_C$ is the voltage division ratio of the low-voltage capacitor.

Furthermore, the aforementioned 1 #photodetector converts the received optical signal into a voltage signal $u_{o1}$. Similarly, the 2 #photodetector converts the received optical signal into a voltage signal $u_{o2}$. The expressions for the voltage signals $u_{o1}$ and $u_{o2}$ are as follows:

$$u_{o1}=U_{s1}(1+k K_C u_1),$$

$$u_{o2}=U_{s2}(1-k K_C u_1),$$

Where $U_{s1}$ and $U_{s2}$ are the DC bias voltages for $u_{o1}$ and $u_{o2}$, respectively.

Furthermore, the expressions for the mid-to-low frequency voltage signals $u_{1L}(f_1)$ and $u_{2L}(f_1)$ are as follows:

$$u_{1L}(f_1)=G_1 U_{s1} k K_C u_1(f_1),$$

$$u_{2L}(f_1)=-G_1 U_{s2} k K_C u_1(f_1),$$

The expressions for the high-frequency voltage signals $u_{1H}(f_2)$ and $u_{2H}(f_2)$ are as follows:

$$u_{1H}(f_2)=G_2 U_{s1} k K_C u_1(f_2),$$

$$u_{2H}(f_2)=-G_2 U_{s2} k K_C u_1(f_2),$$

Where $U_{s1}$ and $U_{s2}$ are the DC bias voltages for $u_{o1}$ and $u_{o2}$, respectively.

Furthermore, the cutoff frequency of the above low-pass filter circuit is 0.1 Hz.

The lower limit cutoff frequency of the 1 #bandpass filter amplifier circuit is 1 Hz, and the upper limit cutoff frequency is set to 10 kHz.

The lower limit cutoff frequency of the 2 #bandpass filter amplifier circuit is 10 kHz, and the upper limit cutoff frequency is set to 50 MHz.

Furthermore, the above-mentioned voltage signals in the medium-low frequency range $u_{oL}(f_1)$, and the voltage signals in the high frequency range $u_{oH}(f_2)$ are respectively sent to the monitoring and analysis host through the data acquisition card.

Furthermore, the aforementioned optical wideband measurement section also includes a voltage limiting device, which is connected in parallel across the terminals of the low-voltage capacitor.

Furthermore, the aforementioned capacitor voltage divider includes series-connected high-voltage and medium-voltage capacitors, with the low-voltage capacitor connected in series between the low-voltage terminal and the ground terminal of the medium-voltage capacitor.

The expression for the terminal voltage of the low-voltage capacitor $u_{C3}$ is as follows:

$$u_{C3} = \frac{C_1 C_2}{C_1 C_2 + C_1 C_3 + C_2 C_3} u_1 = K_C u_1,$$

Where $C_1$, $C_2$, and $C_3$ represent the capacitance values of the high-voltage capacitor, medium-voltage capacitor, and low-voltage capacitor respectively. $K_C$ is the voltage divider ratio of the low-voltage capacitor, and $u_1$ is the wideband voltage signal from the primary side connected to the voltage monitoring terminal.

Furthermore, the material of the low-voltage capacitor mentioned above is the same as that of the high-voltage and medium-voltage capacitors.

The beneficial effects of the present invention are as follows:

(1) The proposed wideband measurement system for mixed-connected CVT based on an optical voltage sensor is an extended modification of the conventional CVT. It involves connecting a low-voltage capacitor in series between the low-voltage terminal and the ground terminal of the conventional CVT. This forms a voltage divider circuit with the high-voltage capacitor and the medium-voltage capacitor of the original CVT's capacitor voltage divider. Consequently, it achieves wideband measurement functionality encompassing measurements of power-frequency voltage, harmonic voltage, and transient high-frequency voltage.

(2) The low-voltage capacitor used in this invention is implemented in parallel using capacitor components with the same material, structure, and process as the high-voltage and medium-voltage capacitors of the original capacitor voltage divider of the conventional CVT. This not only ensures that the addition of the low-voltage capacitor does not affect the lifespan of the original CVT product, but also guarantees that the voltage divider ratio of the low-voltage capacitor remains unaffected by temperature variations.

(3) The optical voltage sensor used in this invention is a passive sensor, composed entirely of optical insulation materials. It does not require a power supply in the field and is connected to the signal processing module located in the control room via optical cables. It has strong immunity to electromagnetic interference and is not easily affected by harsh electromagnetic environments in the field. The sensor exhibits excellent stability, high reliability, good safety, and strong resistance to electromagnetic interference.

(4) The signal processing solution of the signal processing unit in this invention employs different bandpass filters to separate and process the mid-to-low frequency voltage signals and high-frequency voltage signals. This approach effectively enhances the signal-to-noise ratio and reduces the impact of noise on measurement accuracy.

DETAILED DESCRIPTION OF THE EMBODIMENTS

In the following sections, the technical solutions in the exemplary embodiments of the present invention will be described in a clear and comprehensive manner, in conjunction with the accompanying drawings. It is evident that the described embodiments are only a part of the implementation of the present invention, and not the entirety of the embodiments. Based on the embodiments disclosed herein, all other embodiments obtained by those skilled in the art without inventive efforts are also within the scope of protection of the present invention. It should be noted that, unless conflicting, the embodiments and the features in the embodiments of the present invention can be combined with each other.

Figure 3:
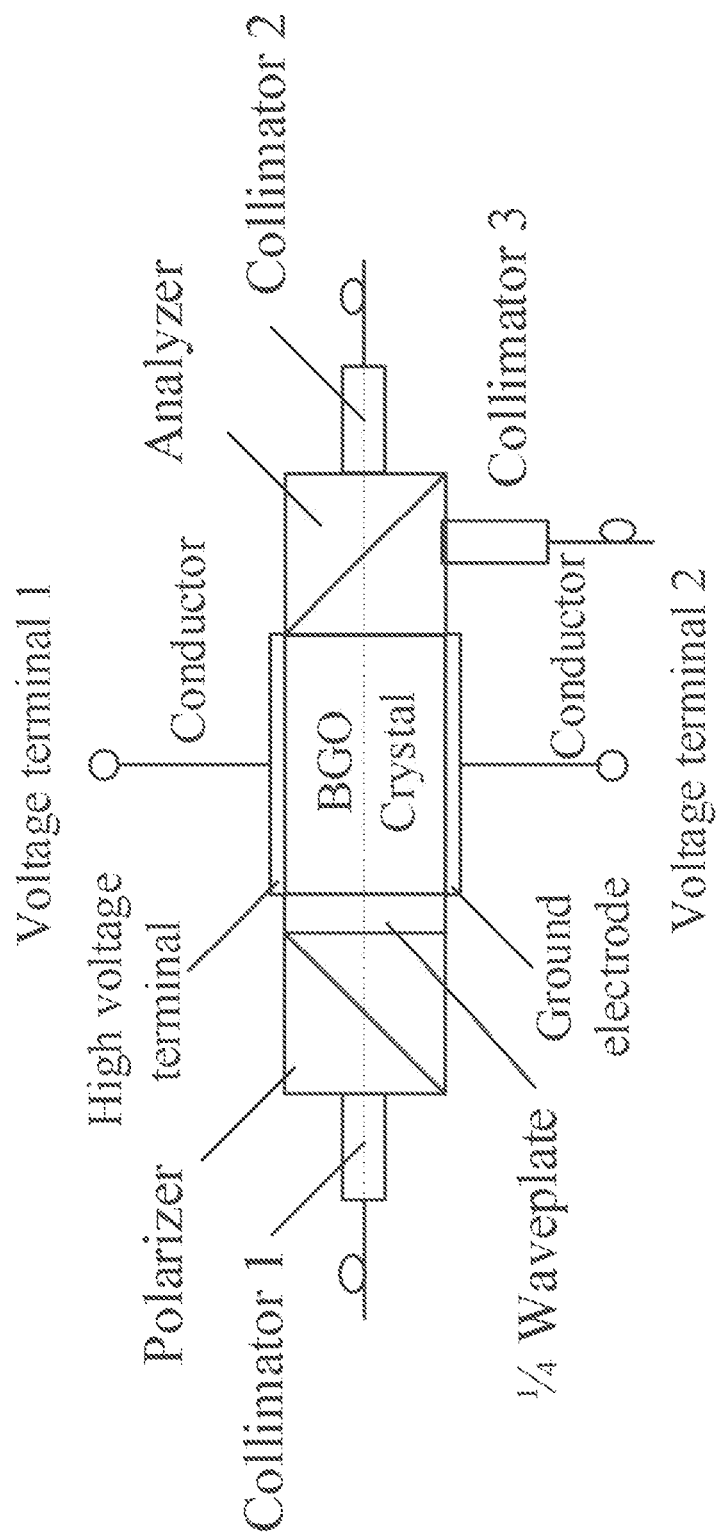
FIG. 3 shows the schematic diagram of the structure of the optical voltage sensor.

As shown in FIG. 3, the LED light source emits a carrier light signal of a certain wavelength, which is transmitted along the optical fiber to the collimator 1. The light then passes through a polarizer, and converts into linearly polarized light. Subsequently, the linearly polarized light passes through a λ/4 waveplate, and transforms into circularly polarized light. When the circularly polarized light passes through the BOO electro-optic crystal, it undergoes birefringence under the influence of voltage, resulting in elliptically polarized light. After passing through an analyzer, the elliptically polarized light is converted into linearly polarized light with intensity proportional to the measured voltage. The analyzer splits the output light into two beams in a 1:1 ratio, which are aggregated by collimator 2 and collimator 3, respectively, and then transmitted through optical fibers to the photodetector for photoelectric conversion. The measured voltage is obtained by demodulation using a signal processing circuit.

The optical voltage sensor is based on the Pockels electro-optic effect to sense voltage. Light passing through the polarizer of the optical voltage sensor generates linearly polarized light. Under the influence of the measured voltage u, the linearly polarized light passes through the BOO crystal. The two beams of light emitted exhibit a phase difference δ, represented as follow.

$$\delta = ku,$$

In the equation, k represents the electro-optic coefficient.

In principle, the optical voltage sensor does not have bandwidth and response time issues. It can accurately convert voltage signals and is considered a passive sensor. The processing circuit and the sensor are connected via an optical cable, enabling complete electrical isolation between the primary and secondary of the monitoring system. The optical voltage sensor is an ideal wideband voltage sensing device for power systems.

Based on the above principles, to realize the wideband modification of conventional CVTs with widespread application in power systems, this implementation proposes a wideband monitoring system for mixed-connected CVT based on an optical voltage sensor. In this system, a low-voltage capacitor is connected in series between the low-voltage terminal and the ground terminal of the conventional CVT. This forms a voltage divider circuit with the high-voltage and medium-voltage capacitors of the original CVT's capacitor voltage divider, enabling simultaneous measurement of power frequency voltage, harmonic voltage, and transient high-frequency voltage.

Figure 1:
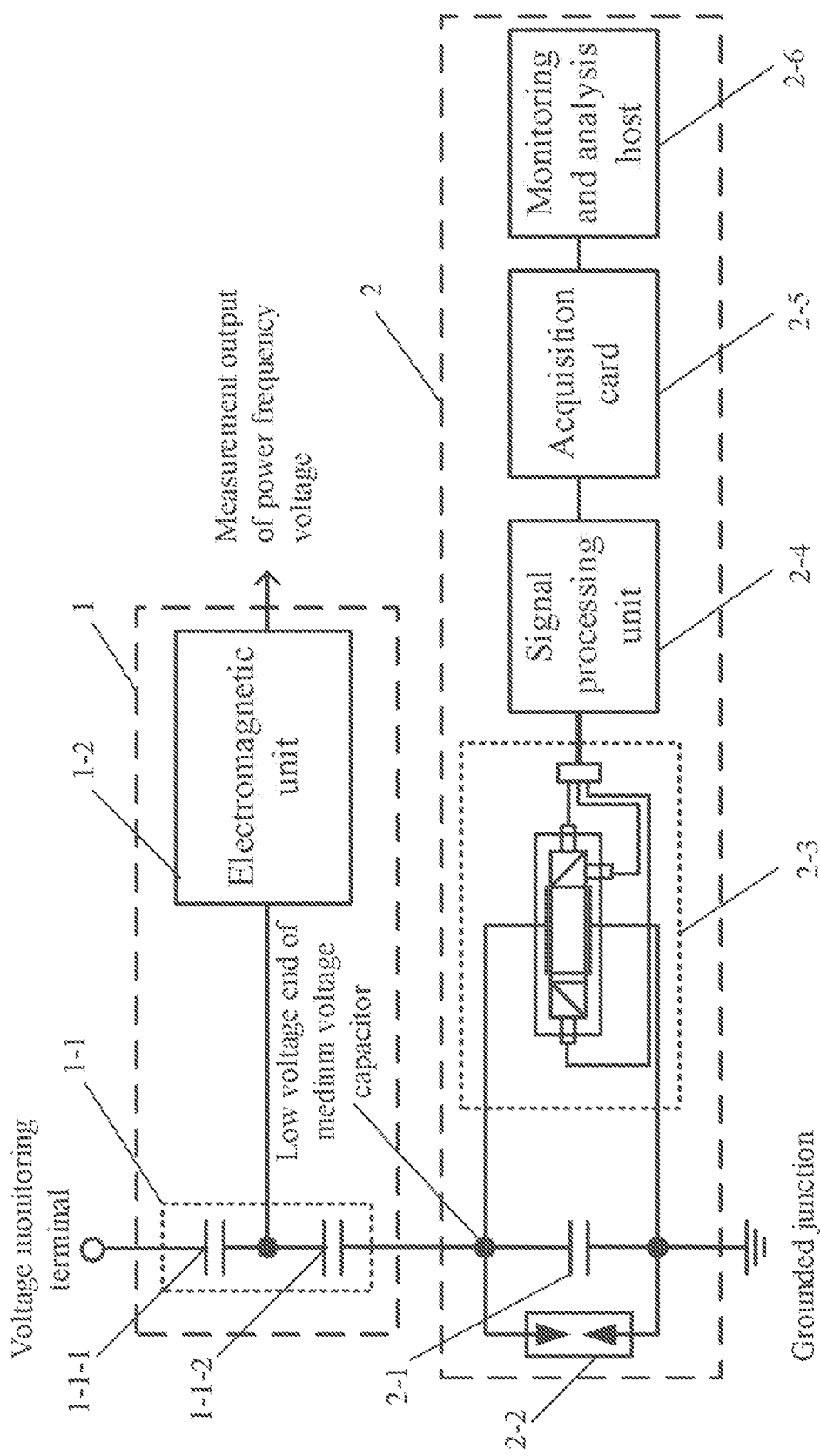
FIG. 1 illustrates the schematic diagram of a wideband measurement system for mixed-connected CVT based on an optical voltage sensor, as described in this invention.
Figure 2:
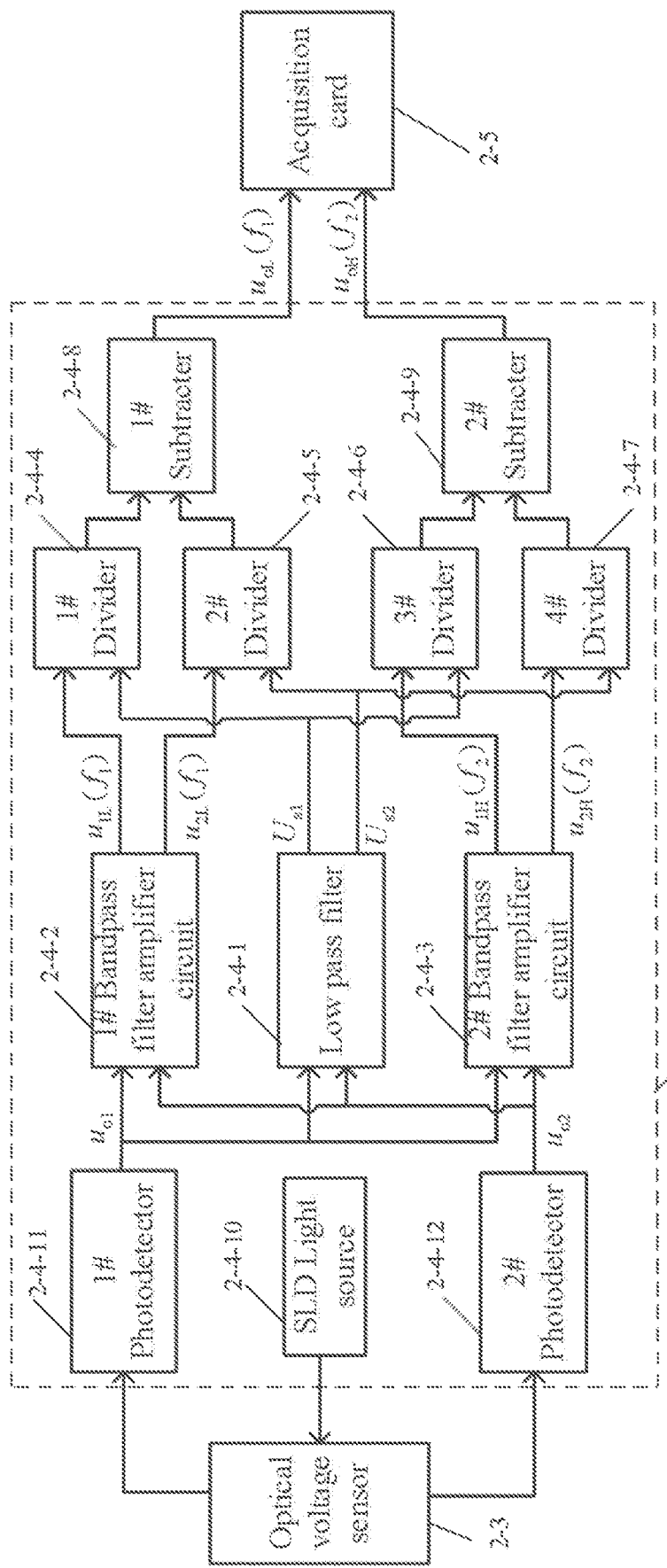
FIG. 2 depicts the schematic diagram of the signal processing principle within the signal processing unit.

Referring to FIG. 1, this embodiment specifically describes a optical voltage sensor-based wideband measurement system for the mixed-connected CVT. The system includes a power frequency measurement part 1 and an optical wideband measurement part 2. The power frequency measurement part 1 is used to measure the tested power frequency voltage signal. It consists of a capacitor voltage divider 1-1 and an electromagnetic unit 1-2. The capacitor voltage divider 1-1 consists of series-connected high voltage capacitor 1-1-1 and medium voltage capacitor 1-1-2. The optical wideband measurement part 2 includes: a low-voltage capacitor 2-1, a voltage limiting device 2-2, an optical voltage sensor 2-3, a signal processing unit 2-4, an acquisition card 2-5, and a monitoring and analysis host 2-6.

The signal processing unit 2-4 includes: a low-pass filtering circuit 2-4-1, a 1 #bandpass filter amplifier circuit 2-4-2, a 2 #bandpass filter amplifier circuit 2-4-3, a 1 #divider 2-4-4, a 2 #divider 2-4-5, a 3 #divider 2-4-6, a 4 #divider 2-4-7, a 1 #subtractor 2-4-8, a 2 #subtractor 2-4-9, an SLD light source 2-4-10, a 1 #photodetector 2-4-11, and a 2 #photodetector 2-4-12.

The low-voltage capacitor 2-1 is connected in series between the low-voltage terminal and the ground terminal of the capacitor voltage divider 1-1 in the power frequency measurement part 1 of the CVT. It forms a voltage divider circuit with the high-voltage capacitor 1-1-1 and the medium voltage capacitor 1-1-2 of the original CVT's capacitor voltage divider. The material of the low-voltage capacitor 2-1 is the same as that of the high-voltage capacitor 1-1-1 and the medium voltage capacitor 1-1-2. This ensures that adding the low-voltage capacitor 2-1 does not affect the lifespan of the original CVT product and also guarantees that the voltage division ratio of the low-voltage capacitor 2-1 is not influenced by temperature changes. The voltage limiting device 2-2 is connected in parallel between the two terminals of the low-voltage capacitor 2-1, serving the purpose of limiting overvoltage.

The optical voltage sensor 2-3 is installed locally in the equipment base enclosure and is connected to the signal processing unit 2-4 located in the control room through an optical cable. The electrodes of the optical voltage sensor 2-3 are connected in parallel to the terminals of the low-voltage capacitor 2-1. The SLD light source 2-4-10 serves as the triggering light source for the optical voltage sensor 2-3. When triggered by the SLD light source 2-4-10, the optical voltage sensor 2-3 splits the light signal modulated by the low-voltage capacitor 2-1 and into two beams. These two beams are then incident on the 1 #photodetector 2-4-11 and the 2 #photodetector 2-4-12, respectively, and are converted into voltage signals $u_{o1}$ and $u_{o2}$.

The low-pass filtering circuit 2-4-1 extracts the DC bias voltage, $U_{s1}$ and $U_{s2}$, respectively, from the two voltage signals, $u_{o1}1$ and $u_{o2}$.

The 1 #bandpass filter amplifier circuit 2-4-2 performs bandpass filtering and amplification on the voltage signals, $u_{o1}$ and $u_{o2}$, separately, resulting in the acquisition of the medium-to-low-frequency voltage signals, $u_{1L}(f_1)$, and $u_{2L}(f_1)$, respectively. The 2 #bandpass filter amplifier circuit 2-4-3 performs bandpass filtering and amplification on the voltage signals, $u_{o1}$ and $u_{o2}$, separately, resulting in the acquisition of the high-frequency voltage signals, $u_{1H}(f_2)$, and $u_{2H}(f_2)$, respectively.

The 1 #divider 2-4-4 calculates the quotient A of the medium-to-low-frequency voltage signal $u_{1L}(f_1)$ divided by the DC bias voltage $U_{s1}$. The 2 #divider 2-4-5 calculates the quotient B of another medium-to-low-frequency voltage signal $u_{2L}(f_1)$ divided by the DC bias voltage $U_{s2}$. The 3 #divider 2-4-6 calculates the quotient C of the high-frequency voltage signal $u_{1H}(f_2)$ divided by the DC bias voltage $U_{s1}$. The 4 #divider 2-4-7 calculates the quotient D of another high-frequency voltage signal $u_{2H}(f_2)$ divided by the DC bias voltage $U_{s2}$.

The 1 #subtractor 2-4-8 calculates the difference between the quotient A and another quotient B to obtain the medium-to-low-frequency voltage signal $u_{oL}(f_1)$. The 2 #subtractor 2-4-9 calculates the difference between the quotient c and another quotient D to obtain the high-frequency voltage signal $u_{oH}(f_2)$.

The medium-to-low-frequency voltage signal $u_{oL}(f_1)$ and the high-frequency voltage signal $u_{oH}(f_2)$ are sent to the monitoring and analysis host 2-6 through data acquisition card 2-5.

The monitoring and analysis host 2-6 calculates the wideband voltage signal on the primary side according to the following equation.

$$u_{oL}(f_1) = G_1 k K_C u_1(f_1),$$

$$u_{oH}(f_2) = G_2 k K_C u_1(f_2),$$

Wherein, $G_1$ and $G_2$ are the amplification factors of the 1 #bandpass filter amplifier circuit 2-4-2 and the 2 #bandpass filter amplifier circuit 2-4-3, respectively. $u_1(f_1)$ and $u_1(f_2)$ represent the medium-to-low-frequency voltage component and the high-frequency voltage component, respectively. $u_1$ is the wideband voltage signal on the primary side loaded at the voltage monitoring terminal, where the voltage monitoring terminal is the high-voltage end of the capacitor voltage divider 1-1. k is the electro-optic coefficient, and $K_C$ is the voltage division ratio of the low-voltage capacitor 2-1.

In this embodiment, the 1 #photoelectric detector 2-4-11 converts the received optical signal into a voltage signal $u_{o1}$, while the 2 #photoelectric detector 2-4-12 converts the received optical signal into a voltage signal $u_{o2}$. The expressions for the voltage signals $u_{o1}$ and $u_{o2}$ are as follows:

$$u_{o1} = U_{s1}(1 + k K_C u_1),$$

$$u_{o2} = U_{s2}(1 - k K_C u_1),$$

Wherein, $U_{s1}$ and $U_{s2}$ represent the DC bias voltages of $u_{o1}$ and $u_{o2}$, respectively.

The expressions for the medium-to-low-frequency voltage signals $u_{1L}(f_1)$ and $u_{2L}(f_1)$ are as follows:

$$u_{1L}(f_1) = G_1 U_{s1} k K_C u_1(f_1),$$

$$u_{2L}(f_1) = -G_1 U_{s2} k K_C u_1(f_1),$$

The expressions for the high-frequency voltage signals $u_{1H}(f_2)$ and $u_{2H}(f_2)$ are as follows:

$$u_{1H}(f_2) = G_2 U_{s1} k K_C u_1(f_2),$$

$$u_{2H}(f_2) = G_2 U_{s2} k K_C u_1(f_2),$$

Wherein, $U_{s1}$ and $U_{s2}$ represent the DC bias voltages of $u_{o1}$ and $u_{o2}$, respectively.

In this embodiment, the cutoff frequency of the low-pass filter circuit 2-4-1 is set to 0.1 Hz to ensure accurate measurement of low-frequency voltage signals. The lower limit cutoff frequency of the bandpass filter amplifier circuit 1-2-2 is set to 1 Hz, and the upper limit cutoff frequency is set to 10 kHz to ensure accurate measurement of the 50th harmonic voltage signal. The lower limit cutoff frequency of the bandpass filter amplifier circuit 2-4-3 is set to 10 kHz to reduce the influence of low-frequency noise on measurement accuracy, and the upper limit cutoff frequency is set to 50 MHz to ensure accurate measurement of lightning transient voltage signals.

The expression for the terminal voltage $u_{C3}$ of the low-voltage capacitor 2-1 is as follows:

$$u_{C3} = \frac{C_1 C_2}{C_1 C_2 + C_1 C_3 + C_2 C_3} u_1 = K_C u_1,$$

Wherein, $C_1$, $C_2$, and $C_3$ represent the capacitance values of high-voltage capacitor 1-1-1, medium-voltage capacitor 1-1-2, and low-voltage capacitor 2-1 respectively. $K_C$ is the voltage dividing ratio of the low-voltage capacitor 2-1, and $u_2$ is the wideband voltage signal applied at the primary side of the voltage monitoring terminal.

The proposed optical voltage sensor-based wideband monitoring system for mixed-connected CVT, presented in this embodiment, connects a low-voltage capacitor in series between the low-voltage terminal and the ground terminal of the conventional CVT's medium-voltage capacitor. This forms a voltage divider circuit with the high-voltage capacitor and medium-voltage capacitor of the conventional CVT's capacitor voltage divider. The modification achieved through this approach enables the conventional CVT to have wideband measurement capabilities for both power frequency voltage, harmonic voltage, and transient high-frequency voltage measurements. The low-voltage capacitor used in this invention is made of the same material, structure, and manufacturing process as the high-voltage and medium-voltage capacitors of the conventional CVT's capacitor voltage divider. This not only ensures that the addition of the low-voltage capacitor does not affect the lifespan of the original CVT product but also guarantees that the voltage dividing ratio of the low-voltage capacitor is not affected by temperature variations.

The optical voltage sensor used in this embodiment is a passive sensor composed entirely of optical insulation materials. It does not require a power supply on-site and is connected to the signal processing module located in the control room via an optical cable. It exhibits strong resistance to electromagnetic interference and is less susceptible to adverse electromagnetic environments on-site. It features excellent stability, high reliability, good safety, and strong immunity to electromagnetic interference. In the signal processing unit, a different bandpass filter approach is employed to separate and process the low-frequency voltage signals and high-frequency voltage signals. This effectively improves the signal-to-noise ratio and reduces the impact of noise on measurement accuracy.

While specific embodiments are described in this paper to illustrate the principles and applications of the invention, it should be understood that these embodiments are merely examples and not intended to limit the scope of the invention as defined by the appended claims. It should be understood that numerous modifications can be made to the exemplary embodiments and other arrangements can be devised as long as they do not depart from the spirit and scope of the invention as defined by the appended claims. It should be further understood that different dependent claims and features described in this paper can be combined in ways that are different from those described in the original claims. Additionally, features described in one embodiment can be used in other described embodiments.

What is claimed is:

1. A wideband measurement system for mixed-connected capacitive voltage transformer (CVT) based on an optical voltage sensor, comprising a CVT power frequency measurement section and an optical wideband measurement section;

wherein the optical wideband measurement section comprises a low-voltage capacitor, an optical voltage sensor, a signal processing unit, and a monitoring and analysis host;

wherein the CVT power frequency measurement section comprises a voltage divider, and the voltage divider comprises a series connection of a high-voltage capacitor and a mid-voltage capacitor;

the low-voltage capacitor is connected between a lower end terminal of the mid-voltage capacitor and a grounded junction of the optical wideband measurement section;

the optical voltage sensor is connected in parallel to two ends of the low-voltage capacitor;

the optical voltage sensor, triggered by a superluminescent diode (SLD) light source in the signal processing unit, splits a light signal modulated by the low-voltage capacitor into two beams and directs the two beams into the signal processing unit;

the signal processing unit converts the two incoming light signals into two voltage signals being $u_{o1}$ and $u_{o2}$, and obtains a voltage signals in a medium-to-low frequency range $u_{oL}(f_1)$ and a voltage signal in a high-frequency range $u_{oH}(f_2)$; and the monitoring and analysis host captures the voltage signals in the medium-to-low frequency range $u_{oL}(f_1)$ and the voltage signal in the high-frequency range $u_{oH}(f_2)$, and calculates to obtain a wideband voltage signal;

wherein the signal processing unit comprises: a low-pass filter circuit, a 1 #bandpass filter amplifier circuit, a 2 #bandpass filter amplifier circuit, a 1 #divider, a 2 #divider, a 3 #divider, a 4 #divider, a 1 #subtractor, a 2 #subtractor, the SLD light source, a 1 #photodetector, and a 2 #photodetector;

the SLD light source serves as a triggering light source for the optical voltage sensor;

the two beams of light emitted from the optical voltage sensor are respectively converted into the voltage signals $u_{o1}$ and $u_{o2}$, by the 1 #photodetector and the 2 #photodetector;

the low-pass filter circuit extracts a direct-current (DC) bias voltage $U_{s1}$ from the voltage signal $u_{o1}$ and extracts a DC bias voltage $U_{s2}$ from the voltage signal $u_{o2}$;

the 1 #bandpass filter amplifier circuit performs bandpass filtering and amplification on the voltage signal $u_{o1}$ to obtain a medium-to-low frequency voltage signal $u_{1L}(f_1)$ and performs bandpass filtering and amplification on the voltage signal $u_{o2}$ to obtain a medium-to-low voltage signal $u_{2L}(f_1)$; the 2 #bandpass filter amplifier circuit applies bandpass filtering and amplification to the voltage signal $u_{o1}$ to obtain a high-frequency voltage signal $u_{1H}(f_2)$ and applies bandpass filtering and amplification to the voltage signal $u_{o2}$ to obtain a high-frequency voltage signal $u_{2H}(f_2)$;

the 1 #divider calculates a quotient A between the medium-to-low frequency voltage signal $u_{1L}(f_1)$ and the DC bias voltage $U_{s1}$; the 2 #divider calculates a quotient B between the medium-to-low frequency voltage signal $u_{2L}(f_1)$ and the DC bias voltage $U_{s2}$; the 3 #divider calculates a quotient C between the high-frequency voltage signal $u_{1H}(f_2)$ and the DC bias voltage $U_{s1}$, while the 4 #divider calculates a quotient D between the high-frequency voltage signal $u_{2H}(f_2)$ and the DC bias voltage $U_{s2}$;

the 1 #subtractor takes a difference between the quotient A and the quotient B to obtain the voltage signal in the medium-to-low frequency range $u_{oL}(f_1)$; the 2 #subtractor calculates a difference between the quotient C and the quotient D to obtain the voltage signal in the high-frequency range $u_{oH}(f^2)$;

and wherein the monitoring and analysis host calculates the wideband voltage signal according to following equation:

$$u_{oL}(f_1)=G_1 k K_C u_1(f_1),$$

$$u_{oH}(f_2)=G_2 k K_C u_1(f_2),$$

wherein $G_1$ and $G_2$ are amplification factors of the 1 #bandpass filter amplifier circuit and the 2 #bandpass filter amplifier circuit, respectively; $u_1(f_1)$ and $u_1(f_2)$ represent a low-frequency voltage component and a high-frequency voltage component, respectively; $u_1$ denotes the wideband voltage signal loaded on a voltage monitoring terminal, wherein the voltage monitoring terminal is a high-voltage end of the voltage divider; k is an electro-optic constant, and $K_C$ is a voltage division ratio of the low-voltage capacitor.

2. The wideband measurement system for the mixed-connected CVT based on the optical voltage sensor according to claim 1, wherein the 1 #photodetector converts a received optical signal into a voltage signal $u_{o1}$; similarly, the 2 #photodetector converts a received optical signal into a voltage signal $u_{o2}$; expressions for the voltage signals $u_{o1}$ and $u_{o2}$ are as follows:

$$u_{o1}=U_{s1}(1+k K_C u_1),$$

$$u_{o2}=U_{s2}(1-k K_C u_1),$$

wherein $U_{s1}$ is the DC bias voltage for $u_{o1}$ and $U_{s2}$ is the DC bias voltages for $u_{o2}$.

3. The wideband measurement system for the mixed-connected CVT based on the optical voltage sensor according to claim 1, wherein expressions of the medium-to-low frequency voltage signals $u_{1L}(f_1)$ and $u_{2L}(f_1)$ are as follows:

$$u_{1L}(f_1)=G_1 U_{s1} k K_C u_1(f_1),$$

$$u_{2L}(f_1)=-G_1 U_{s2} k K_C u_1(f_1),$$

expressions for the high-frequency voltage signals $u_{1H}(f_2)$ and $u_{2H}(f_2)$ are as follows:

$$u_{1H}(f_2)=G_2 U_{s1} k K_C u_1(f_2),$$

$$u_{2H}(f_2)=-G_2 U_{s2} k K_C u_1(f_2),$$

wherein $U_{s1}$ is the DC bias voltage for $u_{o1}$ and $U_{s2}$ is the DC bias voltages for $u_{o2}$.

4. The wideband measurement system for the mixed-connected CVT based on the optical voltage sensor according to claim 3, wherein a cutoff frequency of 0.1 Hz is configured for the low-pass filter circuit;
- a lower limit cutoff frequency of the 1 #bandpass filter amplifier circuit is set to 1 Hz, while an upper limit cutoff frequency of the 1 #bandpass filter amplifier circuit is chosen as 10 kHz;
- a lower limit cutoff frequency of the 2 #bandpass filter amplifier circuit is set to 10 kHz, while an upper limit cutoff frequency of the 2 #bandpass filter amplifier circuit is chosen as 50 MHz.

5. The wideband measurement system for the mixed-connected CVT based on the optical voltage sensor according to claim 1, wherein the voltage signal in the medium-to-low frequency range $u_{oL}(f_1)$ and the voltage signal in the high-frequency range $u_{oH}(f_2)$ are transmitted to the monitoring and analysis host via a data acquisition card.

6. The wideband measurement system for the mixed-connected CVT based on the optical voltage sensor according to claim 1, wherein a voltage limiting device is configured in the optical wideband measurement section; the voltage limiting device is connected in parallel across the low-voltage capacitor.

7. The wideband measurement system for the mixed-connected CVT based on the optical voltage sensor according to claim 1, wherein an expression for a terminal voltage $u_{C3}$ of the low-voltage capacitor is as follows:

$$u_{C3} = \frac{C_1 C_2}{C_1 C_2 + C_1 C_3 + C_2 C_3} u_1 = K_C u_1,$$

wherein $C_1$, $C_2$, and $C_3$ represent capacitance values of the high-voltage capacitor, the mid-voltage capacitor, and the low-voltage capacitor respectively; $K_C$ is a voltage division ratio of the low-voltage capacitor, and $u_1$ is the wideband voltage signal loaded on a voltage monitoring terminal.

8. The wideband measurement system for the mixed-connected CVT based on the optical voltage sensor according to claim 7, wherein material of the low-voltage capacitor is same as that of the high-voltage capacitor and the mid-voltage capacitor.

\* \* \* \* \*